United States Patent [19]

Mainville

[11] Patent Number: 4,709,133
[45] Date of Patent: Nov. 24, 1987

[54] WELDING APPARATUS FOR SIMULTANEOUSLY APPLYING PARALLEL WELDS TO WORKPIECES

[76] Inventor: Jack Mainville, 25 Goffe St., North, Meriden, Conn. 06450

[21] Appl. No.: 847,441

[22] Filed: Apr. 2, 1986

[51] Int. Cl.$^4$ .............................................. B23K 9/12
[52] U.S. Cl. .................................. 219/125.1; 219/136; 219/137.41; 228/6.1
[58] Field of Search .................. 219/125.1, 136, 124.1, 219/124.03, 137.41; 228/4.1, 6 R, 25

[56] References Cited

U.S. PATENT DOCUMENTS

| 2,803,739 | 8/1957 | Bentzen | 219/125.1 |
| 2,832,000 | 4/1958 | Steele | 219/124.03 |
| 4,206,339 | 6/1980 | Beneteau | 219/125.1 |
| 4,234,777 | 11/1980 | Balfanz | 219/125.1 |

FOREIGN PATENT DOCUMENTS 84122 8/1971 German Democratic Rep. ................................. 219/137.41

Primary Examiner—Clifford C. Shaw
Attorney, Agent, or Firm—McCormick, Paulding & Huber

[57] ABSTRACT

Welding apparatus for simultaneously applying a number of parallel welding beads to workpieces for welding the workpieces along their intersecting edges into an assembly. A carriage is arranged for rectilinear motion along a path and holds a number of welding arms for movement with the carriage. The welding arms comprise welding stations and are arranged in a spaced apart relationship to one another and in proximity to workpieces held at the welding station so that the arms follow along the workpiece edges when the carriage moves along the path. A controller energizes and de-energizes a bi-directional motor and electric arc welding apparatus in response to signals provided by position sensing switches that sense the position of the carriage along the path and the controller causes the carriage to be automatically returned to its starting position after a welded assembly is removed from the welding station.

12 Claims, 4 Drawing Figures

1

WELDING APPARATUS FOR SIMULTANEOUSLY APPLYING PARALLEL WELDS TO WORKPIECES

BACKGROUND OF THE INVENTION

The present invention relates generally to welding apparatus and deals more specifically with a welding apparatus for simultaneously applying a number of spaced apart, parallel welding beads to workpieces to weld them together.

The repetitive welding of workpieces together to fabricate a number of similar assemblies each of which may be a final product or part of another assembly is time consuming and somewhat monotonous to the welding operator. Generally, the fabricated assembly is required in high numbers and its fabrication is often one that can be automated. The repetitive fabrication of such assemblies generally requires the operator to clamp the workpieces together and then apply a welding bead along the workpieces' intersecting edges to form the desired assembly. One assembly, for example, used to form a holding frame for a storm water catch basin grating structure such as the type commonly seen at roadsides to catch storm water runoff, includes mounting tabs extending generally laterally from the sides of the holding frame in a spaced apart, parallel relationship to hold the frame in a recess in the catch basin. Because the grating structure and the frame within which the grating rests is susceptable to large stresses, such as the stress produced by the weight of a vehicle bearing down on the grate and frame, the weld holding the frame and the mounting tab together must be of the highest quality to sustain the repeated stresses caused by the heavy weights. In addition, the welded assembly is subject to attack from other forces such as repeated freezing that causes expansion and contraction of the assembly which may affect the weld. In addition to the time associated with clamping the pieces together in the manual fabrication of such assemblies, the monotony associated with the repetitive welding may introduce variations in the welds from assembly-to-assembly and the variations effect the overall quality and uniformity of the welds and consequently, the structural integrity of the assembly.

It is therefore an object of the present invention to provide a welding apparatus that simultaneously applies a number of spaced apart and parallel welds to workpieces to fabricate a desired assembly.

It is another object of the present invention to provide a welding apparatus wherein the applied welding beads are of a uniform length.

It is a further object of the present invention to provide a welding apparatus that automatically moves the welding arms at a welding station relative to the workpieces to be welded.

SUMMARY OF THE INVENTION

In accordance with the present invention, a welding apparatus for simultaneously applying a number of spaced apart, parallel welds to workpieces to weld them together into an assembly is presented. The welding apparatus includes a frame having a substantially rectangular planar work surface and a number of welding arms arranged in a spaced relationship to one another on the work surface wherein each arm comprises a welding station. A carriage is mounted on the framework surface and is arranged for rectilinear movement along a path extending between the front and rear portions of the work surface and for moving the welding arms through the welding stations. The workpieces are clamped together and to the framework surface to hold them in an alignment so that a welding bead is applied to the intersection of the edges of the workpieces as the welding arms move through the welding station. Motor means are provided to move the carriage relative to the welding stations along the path. Control means control the motor means and the welding arms to simultaneously apply parallel welding beads to the workpieces as the welding arms move through the welding stations.

The invention further resides in a first position limit switch for sensing the carriage at a first position along the path and a second position limit switch for sensing the carriage at a second position along the path. Means included in the control means respond to the activation of the first limit switch to energize the motor means and the welding means. Other means included in the control means respond to the activation of the second limit switch to de-energize the motor means and the welding means when the carriage moves to the second position. A third switch senses the presence (or absence) of the workpieces at the welding station when the carriage is at the second position. Additional other means in the control means is sensitive to the operation of the third limit switch and responds to the operation of the switch when the workpiece is removed to activate the motor means in a direction which causes the carriage to move from the second position back to the first position in readiness for the next welding operation.

The invention further resides in means in the control means for delaying the energization of the motor means for a predetermined time after the energization of the welding means to permit the welding bead to puddle prior to the movement of the welding arms through the welding station.

The invention further resides in a smoke hood enclosure mounted on the frame for capturing the smoke and welding fumes produced during the welding process and includes hoses for connecting the hood to an exhaust system to discharge the smoke and welding fumes generated during the welding operation.

BRIEF DESCRIPTION OF THE DRAWINGS

Other features and advantages of the present invention will be readily apparent from the following written description and claims taken in conjunction with the drawings wherein:

DETAILED DESCRIPTION OF THE PREFERRED EMBODIMENT

Figure 1:
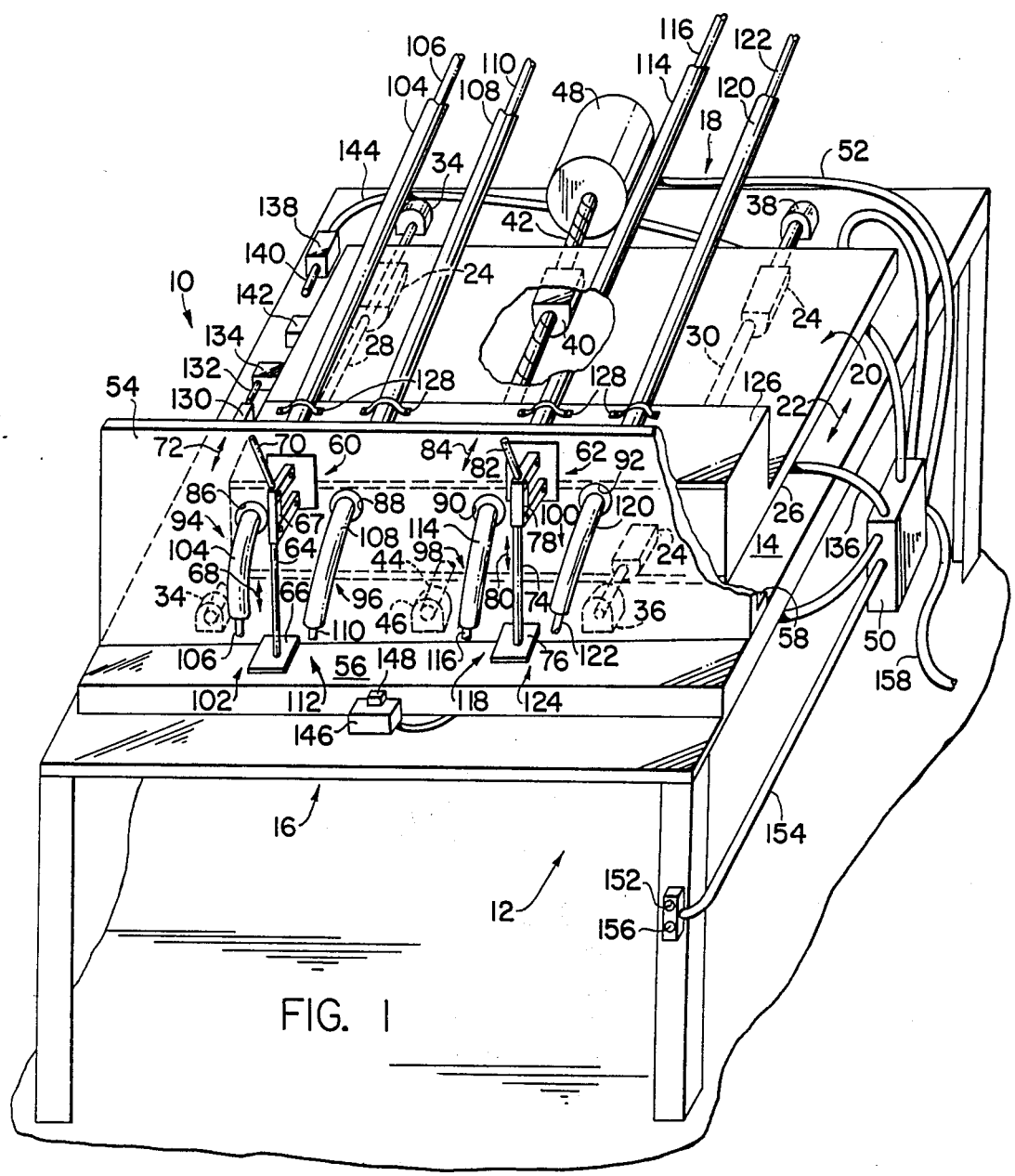
FIG. 1 is a perspective, somewhat diagramatic view of the welding apparatus embodying the present invention.
Figure 2:
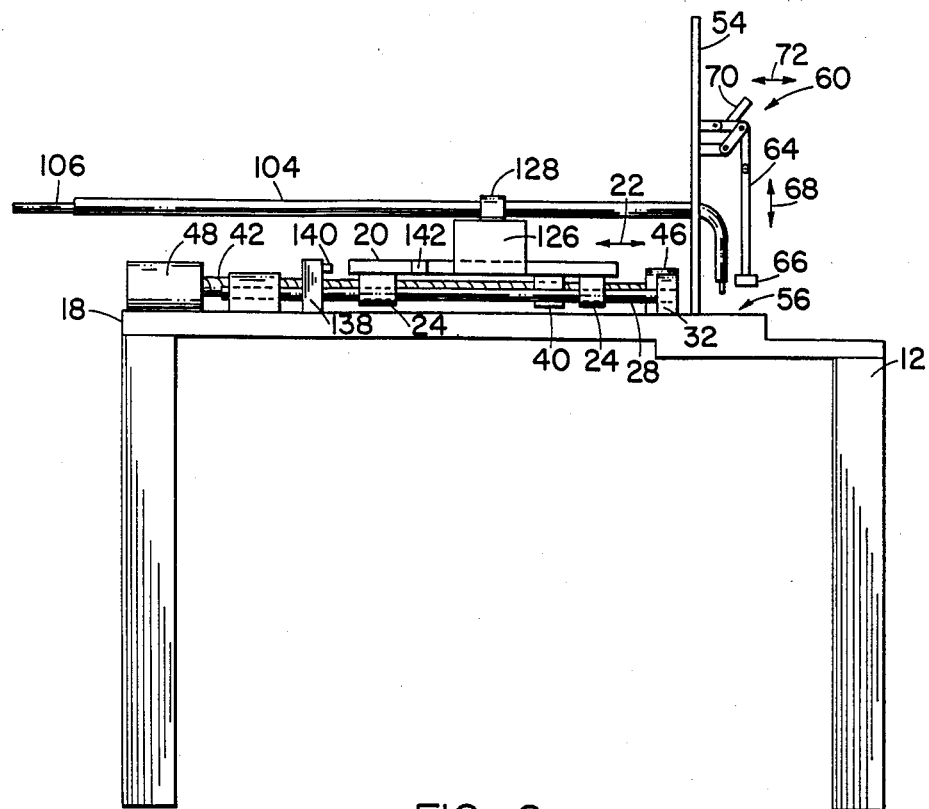
FIG. 2 is a left side view of the apparatus of FIG. 1.

Referring now to the drawings and considering FIGS. 1 and 2 in particular, welding appartus embodying the present invention is shown therein and designated 10. The apparatus 10 includes a frame 12 having a substantially planar work surface 14 and includes a front portion 16 and a rear portion 18. The frame 12 and work surface 14 are constructed of any suitable material capable of supporting the remaining elements comprising the welding apparatus and withstanding damage from the welding process. The material used may be sheet steel of a suitable thickness or other material generally well known to those skilled in the art.

Still referring to FIGS. 1 and 2, a carriage 20 is mounted on the work surface 14 and is arranged for rectilinear movement between the front 16 and rear 18 portions of the work surface in the direction of arrow 22. The carriage 20 is attached to pillow blocks 24,24 mounted on the underside 26 of the carriage and the pillow blocks in turn ride on guide bars 28,30 respectively. The guide bars 28,30 are parallel to each other and extend from the front portion 16 to the rear portion 18 of the frame 12. The guide bar 28 is fixedly attached to the work surface 14 by holding members 32,34 mounted to the work surface and each member holds one end of the guidebar. The guide bar 30 is fixedly attached to the work surface 14 in a similar manner by holding members 36,38 mounted to the work surface and each member holds one end of the guide bar.

The carriage 20 and attached pillow blocks 24,24 move on the guide bars 28,30 and are driven in the direction of arrow 22 by a ball nut 40 attached to the underside 26 of the carriage and a threaded screw 42 which passes through the ball nut. The screw 42 is journaled at one end 44 in a bushing 46 mounted near the front portion 16 of the work surface 14 and substantially midway between the guide bars 28,30. The other end of the threaded screw 42 is coupled to and driven by a motor 48.

The motor 48 is located near the rear portion 18 of the frame 12 and is mounted on the work surface 14 substantially midway between the guide bars 28,30 so that the threaded screw 42 is parallel to the guide bars. The motor 48 is connected to a controller 50 via a conduit 52 through which the motor receives power and control signals generated by the controller to energize and de-energize the motor and to control the direction of rotation of the threaded screw 42 coupled to it. The motor 48 in the illustrated example is a high torque, bi-directional DC motor and is well known to those skilled in the art. The controller 50 comprises standard electromechanical devices logically arranged for sensing input signals and responding to those signals to produce appropriate control signals in a well known manner to control the motor and the arc welding apparatus.

The frame 12 also includes a back plate 54 attached to and extending upwardly from the work surface 14 of the frame and the width of the back plate is substantially equal to the width of the frame. The plate 54 may be welded to the surface 14 or otherwise attached for example, by means of a bracket 58 connected to the surface 14 and the plate 54 using conventional mounting methods well known to those skilled in the art. The back plate 54 is stationary with respect to carriage movement in the direction of arrow 22 as the carriage is driven by the motor 48. The back plate 54 includes two off-center clamps 60,62 each having a clamping and nonclamping position for holding and releasing a workpiece to and from the surface 14 of the work surface 14 in the vicinity of a clamping surface area 56.

The off-center clamp 60 includes a connecting member 64 attached to a pressure foot 66 at one end near the surface 56 and an articulated element 67 at its opposite end. The foot 66 moves in the direction of arrow 68 when a handle 70 is operated in the direction of arrow 72 to cause the articulated element 67 to operate the clamp 60 between its clamping and nonclamping positions. In the clamping position, a workpiece is held between the pressure foot 66 of the clamp 60 and the surface 56 of the frame 12. Similarly, the off-center clamp 62 includes a connecting member 74 attached to a pressure foot 76 at one end near the surface 56 and to an articulated element 78 at its opposite end. The pressure foot 76 moves in the direction of arrow 80 when a handle 82 is operated in the direction of arrow 84 to cause the articulated element 78 to operate the clamp 62 between its clamping and nonclamping positions. In the clamping position, a workpiece is held between the pressure foot 76 of the clamp 62 and the surface 56 of the frame 12.

The back plate 54 in the illustrated example also includes a number of spaced apart openings 86,88,90 and 92 through which an associated welding arm 94,96,98 and 100 passes. Each arm comprises a welding station at which the intersecting edges of the workpieces are welded during the welding operation. Welding arm 94 is associated with a welding station 102 located at one side of the off-center clamp 60. The arm 94 includes an outer sheath 104 through which welding rod 106 is fed to the welding station during the welding operation. Similarly, welding arm 96 is associated with a welding station 112 located at the side of the off-center clamp 60 opposite welding station 102 and the arm 96 includes an outer sheath 108 through which welding rod 110 is fed to the welding station during the welding operation. Likewise, welding arm 98 is associated with a welding station 118 located at one side of off-center clamp 62 and comprises an outer sheath 114 and welding rod 116 which passes through the sheath. Welding arm 100 is associated with a welding station 124 located at the side of off-center clamp 62 opposite welding station 118 and the arm 100 includes an outer sheath 120 through which welding rod 122 passes.

The outer sheaths 104,108,114 and 120 are relatively stiff and fixedly attached to a gantry 126. The gantry 126 is mounted on the carriage 20 transversely to the direction of movement of the carriage. In the illustrated example, each of the outer sheaths 104,108,114 and 120 are connected to the gantry by U-shaped clamping elements 128,128 to maintain the sheath in a stationary fixed position thereby permitting the welding rod associated with each welding arm to be fed through its respective sheath without changing or otherwise affecting the alignment of the welding arm with respect to the workpiece as the welding arm passes through its associated welding station.

It will be understood that the spacing between the openings 86,88,90 and 96 in the back plate 54 are adjustable to accommodate a desired spaced apart distance between welding arms 94,96,98 and 100 and the associated welding stations at the sides of the off-center clamps 60,62. It will further be understood that although four welding stations are shown in the illustrated example, any desired number of welding stations may be utilized with the present invention without departing from the scope of the invention.

Still referring to FIGS. 1 and 2, a position sensing limit switch 130 is mounted to the work surface 14 and includes an adjustable actuator 132 protruding from the switch. The actuator 132 is in alignment with a tab 134 connected to the carriage 20 and the tab engages with the actuator 132 to operate the switch 130 to its operated condition when the carriage moves to a predetermined position near the front portion 16 of the frame 12. The switch 130 is connected to the controller 50 by a conduit 136 and the controller is sensitive to and responsive to the operation of the switch as explained below.

A second position sensing limit switch 138 is mounted to the work surface 14 and includes an adjustable actuator 140 protruding from the switch. The actuator 140 is in alignment with a tab 142 connected to the carriage 20 and the tab engages with the actuator 140 to operate the switch 138 to its operated condition when the carriage moves to a predetermined position near the rear portion 18 of the frame 12. The switch 138 is connected to the controller 50 by a conduit 144 and the controller is sensitive to and responsive to the operation of the switch 138 as explained below.

The limit switches 130 and 138 are preferably of the type having an adjustable length actuator to permit precise adjustment of the operating point of the switch. The limit switches 130 and 138 function to limit the travel of the carriage 20 between two predetermined points along the travel path and consequently, the length of a welding bead applied to a workpiece at the welding station. The length of a welding bead applied to a workpiece is adjusted to a desired length by adjusting the length of the actuators 132,140 associated with the limit switches 130,138 respectively and the adjustment is possible without removing and remounting the limit switches.

A switch 146 is mounted to the work surface 14 in the vicinity of the clamping surface area 56 to detect the presence (or absence) of a workpiece clamped to the surface 56. The switch 146 includes an actuating member 148 which extends in a direction upwardly from the work surface 14 and is arranged for engagement with a workpiece clamped to the surface 56 to operate the switch to its operated condition. The switch 146 is connected to the controller 50 by a conduit 150 and the controller is responsive to the operation of the switch as explained below during the discussion of the operation of the welding apparatus.

Figure 3:
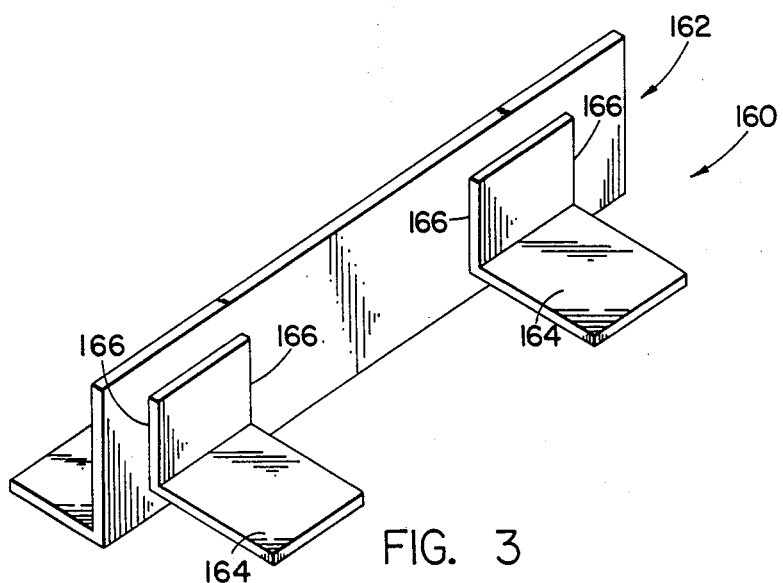
FIG. 3 illustrates a typical assembly of the type particularly suited for fabrication using the welding apparatus of the present invention.

Referring now to FIG. 3, a typical assembly well suited for fabrication using the welding apparatus of the present invention is shown therein and is designated 160. The assembly 160 includes a flat angle iron 162 to which ears or tabs 164,164 are welded. The ears 164,164 are welded to the surface of the angle iron 162 along the intersecting edges 166,166 of the ears and the surface 165 of the flat angle iron.

Referring again to FIGS. 1 and 2, the operation of the welding apparatus is now discussed. The carriage 20 is initially moved to a position at the front portion 16 of the frame 12 in response to the operation of an initializing switch 152 connected to the controller 50 by a conduit 154 and the initial position is detected by the limit switch 130. The controller 50 is sensitive to and responsive to the operation of the initializing switch 152 and provides a signal to the motor 48 to energize it to rotate the threaded screw shaft 42 in a direction associated with carriage movement toward the front portion 16 of the frame 12, and upon detection by the limit switch 130 the controller deenergizes the motor 48. The operator now places the workpieces to be welded into an assembly, such as for example, the one illustrated in FIG. 3, in the desired position between the surface 56 and the pressure feet 66,76 so that the edges of the workpieces are in alignment with the welding arms at the respective welding stations 102,112,118 and 124.

The welding operation is commenced by operating a start switch 156 which provides a start signal to the controller 50 via conduit 154. The controller 50 verifies that the carriage 20 is at its initialized position as sensed by the operation of the limit switch 130 and generates the proper signals to activate electric arc welding equipment (not shown) and the control signals are sent via a conduit 158 connected to the arc welding equipment. Upon activation, the arc welding equipment associated with each welding arm 94,96,98 and 100 begins to apply a weld to the workpieces. Because it takes a finite time to reach the proper temperature to insure a good beginning weld, the controller 50 provides a predetermined delay before energizing the motor 48 thus delaying any movement of the carriage 20 for a predetermined time during which delay time the material to be welded and the welding rod material reach a temperature sufficient to cause the beginning of the welding bead to puddle. It will be understood that the time necessary for proper puddling is dependant upon the material to be welded, the welding rod material used, and the characteristics of the arc welding equipment used. Consequently, the controller 50 includes conventional variable time delay logic circuitry to provide the desired time delay.

After the desired time delay has passed, the controller 50 causes the motor 48 to be energized so that the screw shaft 42 rotates in a direction to advance the carriage 20 in the direction of arrow 22 toward the rear portion 18 of the frame 12. The speed at which the carriage 20 moves is predetermined by the speed of the motor 48 and the ball nut 40 and threaded screw shaft 42 combination. The parameters of the motor 48, screw shaft 42 and ball nut 40 are selected so that the welding arm advances through the welding station at the fastest possible speed while still applying a quality welding bead to the workpiece.

The carriage 20 (and the welding arms moving with the carriage) moves along the travel path until limit switch 138 is operated. The controller 50 is sensitive to the logical combination of the operation of the limit switch 138 and the switch 146 and causes the motor 48 and the electric arc welding equipment to be de-energized when the switches are operated to their operated condition. The operator next releases the welded assembly by operating the clamps 60,62 to the nonclamped position and removes the assembly from the surface 56 and out of engagement with the actuator 148 of switch 146. The controller 50 is responsive to the operation of switch 146 to its non-operated condition which is caused by the removal of the assembly and provides a signal to the motor 48 to energize it. The motor 48 operates to rotate the screw shaft 42 in a direction which moves the carriage 20 and the welding arms moving with the carriage in the direction of the arrow 22 toward the front portion 16 of the frame 12. The carriage moves toward the front until such time that the tab 134 engages the actuator 132 of the limit switch 130 and upon sensing the operation of the limit switch 130 to its operated condition, the controller 50 causes the motor 48 to be de-energized. The welding apparatus is now conditioned to perform a subsequent welding operation in the same manner as described above without reinitialization.

Figure 4:
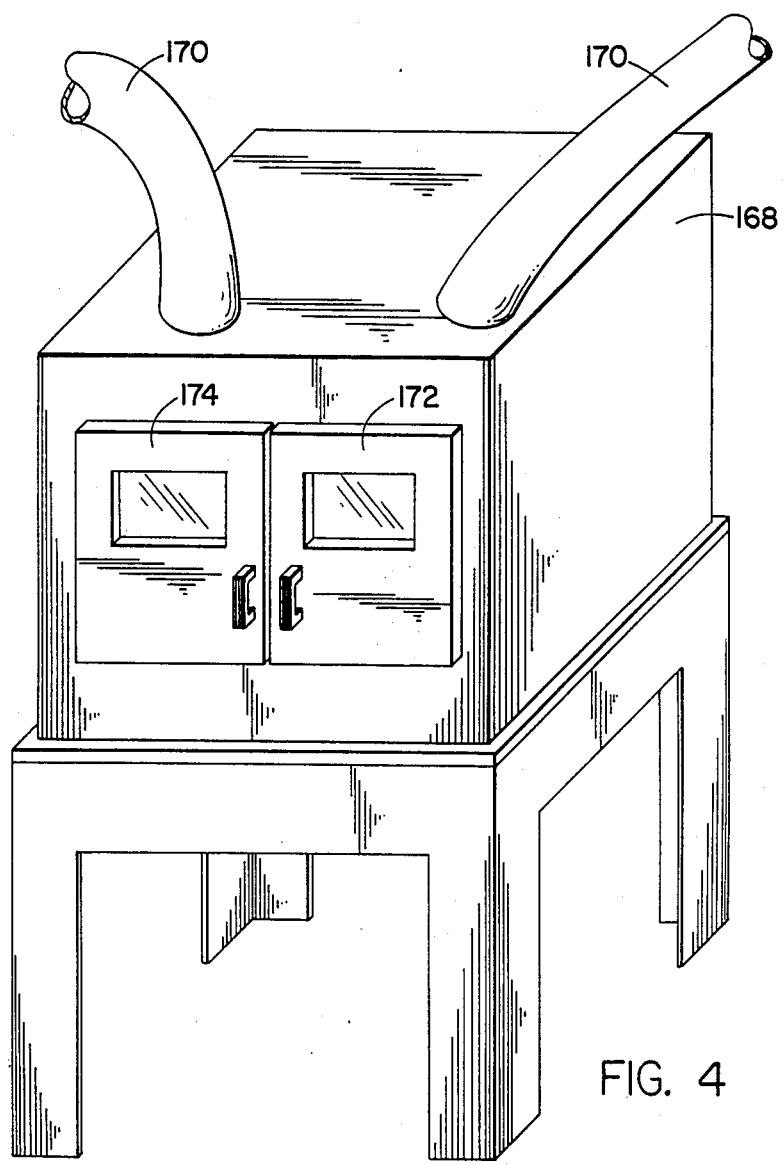
FIG. 4 is a perspective, somewhat diagramatic view of the welding apparatus of FIG. 1 including a frame mounted smoke hood enclosure and hoses for discharging smoke and welding fumes to an exhaust system.

Turning now to FIG. 4, the welding apparatus embodying the present invention is shown therein with a smoke hood enclosure 168 and exhaust hoses 170,170 connected thereto for attachment to an exhaust system discharge smoke and welding fumes created during the welding operation. The hood enclosure 168 includes access doors 172,174 to permit the operator to insert and remove workpieces to and from the welding apparatus. The access doors 172,174 further include viewing windows 176,176 to permit the operator to observe the welding operation. The smoke hood enclosure is fabricated from any suitable sheet metal material sufficiently rigid to retain its shape and to provide a hinge mounting for the access doors 172,174.

Welding apparatus for simultaneously applying a number of parallel welds to workpieces has been described in a preferred embodiment. However, it will be understood that numerous changes and modifications may be made by those skilled in the art and therefore, the invention has been described by way of illustration rather then limitation.

I claim:

1. Welding apparatus for simultaneously applying a number of parallel welds to workpieces to be welded together to form an assembly, said welding apparatus comprising:

a frame having a substantially planar work surface, said work surface having a front poriton, a rear portion and sides, said front and rear poritons being spaced apart from one another;

welding means for welding the workpieces together, said welding means including a number of welding arms arranged in a spaced apart relationship to one another along the work surface and each of said arms comprising a welding station;

carriage means mounted on the frame work surface and arranged for rectilinear movement along a path extending between the front and rear portions of the frame work surface and for holding the welding arms at said welding stations, said workpieces being located on the work surface in the vicinity of a welding station so that the intersecting edges of the workpieces to be welded are in proximity to said welding arm at said welding station;

motor means for moving the carriage means along said path relative to a workpiece at said welding station;

control means coupled to said motor means and said welding means for controlling said motor means and for controlling said welding means to simultaneously apply parallel welding beads to the workpieces a said welding arms move relative to the workpiece;

said motor means moving said carriage means between a first and second position along said path;

first sensing means for sensing the carriage at said first position;

second sensing means for sensing the carriage at said second position;

said first and second sensing means being coupled to said control means to send signals to the control means;

first means in said control means responsive to said first sensing means for energizing said motor means and said welding means when said first position is sensed;

second means in said control means responsive to said second sensing means for de-enegizing said motor means and said welding means when said second position is sensed, and said first responsive means in said control means includes means for delaying the energization of said motor means for a predetermined time after the energization of said welding means to permit the beginning of the welding bead to puddle prior to movement of said welding arms through the welding station.

2. Welding apparatus as defined in claim 1 further including;

third sensing menas coupled to the control means for sensing the presence and the nonpresence of an assembly at a clamping area on said frame when the carriage is sensed at said second position, and third means in said control means responsive to said third sensing means for energizing said motor means to move said carriage from said second position to said first positon when the assembly removed from said clamping area after being sensed by said third sensing means when said carriage is at said second position.

3. Welding apparatus as defined in claim 2 further comprising clamping means located in the vicinity of a welding station for clamping the workpieces in the desired position and for sensing by said third sensing means, said clamping means having a released position for permitting placement of a workpiece into the desired position and for removal of the workpieces from a frame clamping area on said frame work surface, and said clamping means having a clamping position for engaging the surface of a workpiece between a foot associated with the clamping means and said clamping surface.

4. Apparatus as defined in claim 1 wherein said first sensing means comprises a first limit switch mounted at a first predetermined location on said frame work surface and a first tab connected to said carriage means and aligned with said first limit switch, said first limit switch having an actuator to operate said switch to its operated condition when said tab engages said actuator when said carriage is at said first position.

5. Apparatus as defined in claim 1 wherein said second sensing means comprises a second limit switch mounted at a second predetermined location on said frame work surface and a second tab connected to said carriage means and aligned with said second limit switch, said second limit switch having an actuator to operate said switch to its operated condition when said tab contacts said actuator when said carriage is at said second position.

6. Apparatus as defined in claim 1 wherein said first and said second positions are spaced apart a distance substantially equal to the desired length of a welding bead on the workpiece.

7. Apparatus as defined in claim 1 wherein the spacing between adjacent welding arms is adjustable whereby the distance between parallel welding beads is variable to accomodate a number of different width workpieces to be welded together.

8. Apparatus as defined in claim 1 wherein said motor means comprises a bi-directional motor.

9. Apparatus as defined in claim 1 further including a smoke hood mounted on said frame and completely enclosing said carriage means, said welding means and said welding stations for capturing smoke generated during the welding process, said smoke hood having means for connecting the hood to an exhaust system to discharge smoke to the exhaust system, said hood further having doors for permitting access to the carriage means to place and remove workpieces onto and from the carriage means, and said doors further having windows for permitting the viewing of the welding process.

10. Apparatus as defined in claim 1 wherein said welding means comprises electric arc welding means and each of said welding arms comprises a sheath held in a fixed relationship with respect to said carriage means and through which sheath welding rod is advanced to a welding station associated with the welding arm.

11. Welding apparatus for simultaneously applying a number parallel welding beads using electric arc welding apparatus to workpieces for welding the workpieces along their intersecting edges into an assembly, said welding apparatus comprising:

a frame, said frame having front and rear portioins;

carriage means mounted to the frame and arranged for rectilinear motion along a path extending from the front to the rear of said frame;

a number of welding arms associated with the electric arc welding apparatus, said arms being fixedly connected to said carriage means and arranged for movement with said carriage means;

a number of welding stations, each of said stations comprising a pair of said welding arms said arms being arranged in a spaced apart relationship to one another and in proximity of the workpiece at a said welding station, said arms following along the intersecting edges of the workpieces when said carriage means moves along said path;

drive means for moving said carriage means along said path;

control means connected to said drive means and the arc welding apparatus for energizing and de-energizing said drive means and the arc welding apparatus to apply a welding bead along each of the intersecting edges of the workpieces as said welding arm pass through an associated welding station;

position sensing means for sensing the carriage at a first and second predetermined position along said path, said first position being located at a point when said carriage is near the front portion of the frame and corresponding to a point associated with the beginning of a welding bead, said second position being located at a point when said carriage is near the rear portion of the frame and corresponding to a point associated with the end of the welding bead, said sensing means comprising a first position sensing switch arranged to provide a first signal to said controller means when said carriage is at said first predetermined position for causing said control means to energize said drive means and the arc welding apparatus, and a second position sensing switch arranged to provide a second signal to said control means when said carriage is at said second predetermined position for causing said control means to de-energize said drive means and the arc welding apparatus, and assembly sensing means for sensing an assembly at a welding station when said carriage is at said second predetermined positon, said assembly sensing means providing a third signal to said control means to condition said control means to energize said drive means to move said carriage from said second to said first predetermined position when the assembly is removed from the welding station, said control means being sensitive to and responsive to the sequence of the presence and the nonpresence of said third signal, and said control means energizing said drive means after sensing the non-presence of said third signal subsequent to sensing the presence of said third signal when said carriage is at said second position.

12. Welding apparatus for simultaneously applying a number of parallel welds to workpieces to be welded together to form as assembly, said welding apparatus comprising:

a frame having a substantially planar work surface, said work surface having a front portion, a rear portion and sides, said front and rear portions being spaced apart from one another;

welding means for welding the workpiece together, said welding means including a number of welding arms arranged in a spaced apart relationship to one another along the works surface and each of said arms comprising a welding station;

carriage means mounted on the frame work surface and arranged for rectilinear movement along a path extending between the front and rear portions of the frame work surface and for holding the welding arms at said welding stations, said workpieces being located on the work surface in the vicinity of a welding station so that the intersecting edges of the workpieces to be welded are in proximity to said welding arm at said welding station;

motor means for moving the carriage means along said path relative to a workpiece at said welding station;

control means coupled to said motor means and said welding means for controlling said motor means and for controlling said welding means to simultaneously apply parallel welding beads to the workpieces as said welding arms move relative to the workpiece;

said motor means moving said carriage means between a first and second position along said path;

first sensing means for sensing the carriage at said first position;

second sensing means for sensing the carriage at said second position;

said first and second sensing means being coupled to said control means to send signals to the control means;

first means in said control means responsive to said first sensing means for energizing said motor means and said welding means when said first position is sensed;

second means in said control means responsive to said second sensing means for de-energizing said motor means and said welding means when said second position is sensed;

third sensing means coupled to the control means for sensing the presence and the nonpresence of an assembly at a clamping area on said frame when the carriage is sensed at said second position, and third means in said control menas responsive to said third sensing means for energizing said motor means to move said carriage from said second position to said first position when the assembly is removed form said clamping area after being sensed by said third sensing means when said carriage is at said second position.

* * * * *